Sept. 7, 1965
R. J. LAMBERT ETAL
3,205,088
PRESSURE-SENSITIVE ADHESIVE TAPE
Filed Jan. 25, 1962
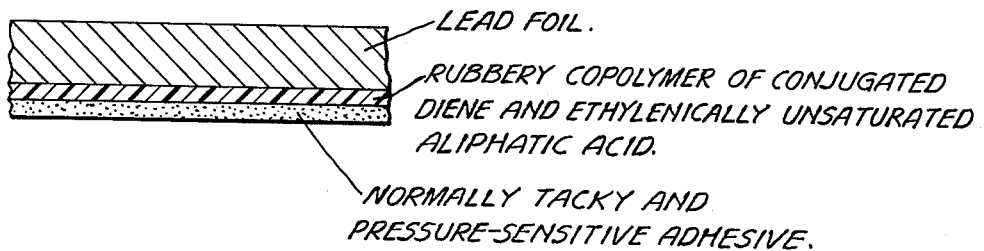
INVENTOR.
RICHARD G. LAMBERT
ALFRED G. SMITH
BY
ATTORNEYS

3,205,088
PRESSURE-SENSITIVE ADHESIVE TAPE

Richard J. Lambert, East Oakdale Township, Washington County, and Alfred G. Smith, White Bear Lake, Minn., assignors to Minnesota Mining and Manufacturing Company, St. Paul, Minn., a corporation of Delaware
Filed Jan. 25, 1962, Ser. No. 168,824
10 Claims. (Cl. 117—75)

This invention relates to normally tacky and pressure-sensitive adhesive sheet material having a lead foil backing. It particularly relates to a simple and economically attractive means for improving the affinity of the backing for tacky pressure-sensitive adhesives.

Lead foil tape has been known for many years, performing valuable functions in electroplating operations, pseudo-leading of glass, burglar detecting devices, X-ray shielding, etc. The surface of lead has such limited receptivity to most organic coatings, however, that it has been necessary—even when a conventional reclaimed natural rubber-based primer was applied—to provide a removable liner for the adhesive to prevent inadvertent adhesive transfer when the tape was wound upon itself in a roll and subsequently unwound. Prior to our invention, we are aware of no other means used to prime lead foil with even the limted effectiveness of reclaimed rubber, and the trend toward synthetic elastomers has rendered reclaimed natural rubber increasingly hard to obtain.

The accompanying drawing, which provides a cross-sectional view of our novel lead foil tape product, will aid in understanding our invention.

In accordance with the present invention we provide on the surface of lead foil an extremely thin flexible rubbery layer of a primer comprising a copolymer of a minor percent of an unsaturated acid in which a carbon-carbon double bond is conjugated with a carbonyl group and a major percent of an acyclic conjugated diene which is itself capable of homopolymerizing to a rubbery state. This primer is applied from solution or dispersion in a volatile liquid, desirably containing at least a small amount of water. The primer itself may be applied easily and cured at temperatures low enough to avoid distortion of the lead foil. The tape product of our invention can be made to possess a degree of adhesion between adhesive and primer on the one hand, and between primer and backing on the other, which is high enough to permit elimination of the traditional liner for the tacky and pressure-sensitive adhesive. Preferred products of our invention possess a high degre of water-resistance, and hence cling tightly to surfaces being masked in electroplating operations.

One of the advantages gained by using the primers disclosed herein lies in the large number of conventional pressure-sensitive adhesives which adhere to them. For example, tackified rubber-phenolic resin of the type described in Drew U.S. Patent No. 2,410,053, polyvinyl alkyl ether-terpene phenolic adhesives of the type described in Ethier U.S. Patent No. 2,965,592, a 95.5:4.5 isooctylacrylate:acrylic acid adhesive of the type described in Ulrich U.S. Reissue Patent No. 24,906, and various well known latex crepe-based adhesives containing zinc oxide vulcanizing agents and wood rosin or modified wood rosin tackifiers, can be satisfactorily adhered.

Our invention will be better understood upon reference to the following illustrative but non-limitative examples, in which all parts are by weight unless otherwise noted:

Example I

To 280 parts of soft water was added 10 parts of acrylic acid, 5 parts of sodium sulfate, 0.5 part of a tertiary dodecyl mercaptan, 1 part of potassium persulfate, and 6 parts of a conventional fatty alcohol sulfate emulsifying agent, while agitating vigorously. Ninety parts of butadiene-1,3 was then added and the reaction mixture heated to 131° F. for 16 hours, after which it was cooled to 70° F. and 0.75 part of a saturated solution of phenylethanolamine added to stop the reaction. The resultant butadiene:acrylic acid copolymer latex contained 34% solids.

A 4-mil sheet of lead foil was provided on one surface with a low adhesion backsize comprising a copolymer of octadecylacrylate and acrylic acid, as described in further detail in Hendricks U.S. Patent No. 2,607,711. The opposite surface of the lead foil was then primed by coating it with the latex described in the preceding paragraph and heating for ten minutes at 150° F. to evaporate the water and provide about 0.2 grain of rubbery copolymer primer per 24 square inches of backing. A solution of a conventional normally tacky and pressure-sensitive adhesive comprising crude rubber and rosin was then applied over the primer coating, the solvent evaporated by heating for 10 minutes at 150° F., and the resultant tape wound upon itself in roll form. The tape was thereafter unwound without transfer of the adhesive to the back of the preceding layer, slit to the desired width, and tested in various ways to determine the adequacy of adhesion. When the tape was doubled over so that the adhesive contacted itself and the contacting surfaces pulled apart, the adhesive did not separate from the backing. When the same pressure-sensitive adhesive was applied directly to unprimed backing and the preceding test repeated the contacting adhesive surfaces could not be separated without removal of all the adhesive from one surface of the foil or the other.

In a somewhat more quantitative test the tape described in this example was adhered by means of double coated pressure-sensitive adhesive tape to a smooth metal backing, the adhesive surface of the lead foil tape lying upward. A second tape having an extremely aggressive Bakelized butadiene:styrene rubber-based adhesive bonded to a cellophane backing was then positioned so that the two adhesive surfaces were in contact. The second tape was then doubled back on itself and removed at constant speed parallel to the plane of the two tapes with the result that the second tape was stripped away from the lead foil tape, carrying with it the crude rubber:rosin adhesive. A force of approximately 60 ounces per half inch width was required to achieve removal, failure occurring primarily by splitting of the crude rubber:rosin adhesive layer. From this test it can be concluded that the adhesion of the primer to both the backing and the crude rubber:rosin adhesive exceeded the value obtained. A force of 50 ounces per half inch of width (the value customarily required to separate reclaimed rubber primer from lead foil backing when conventional lead foil tape is subjected to the same test) has previously been considered satisfactory in this test.

Although the copolymer latex is economical to prepare and functioned highly effectively as a primer in this example, we have found that solutions of copolymer in organic solvents, which wet the backing uniformly and evaporate quickly, are also advantageous. The following examples illustrate the use of such compositions.

Example II

The copolymer latex prepared in Example I was solvent-extracted in conventional fashion with a 75:25 toluol: isopropyl alcohol solution. 1.5 parts of 2,5 di-tertiary amyl hydroquinone antioxidant was then added. The resultant primer composition, having a Brookfield viscosity of 1900 cps. at 25° C. and containing about 10% copolymer, 6% residual water, and 84% solvent was then coated on one surface of a 4-mil lead foil backing and the solvent and water removed by passing the foil, primed surface out, over a 150° F. hot can. When the primed surface was coated with the same pressure-sensitive adhesive employed in Example I, results were substantially the same, an average value of 62 ounces per ½ inch of width being obtained in the test described in the third paragraph of Example I. Methacrylic acid was successfully substituted for acrylic acid in the preparation of the primer composition of this Example II. Other unsaturated acids, e.g., crotonic, maleic and fumaric or their half esters, itaconic, aconitic, mesaconic, angelic, or tiglic may also be employed.

*Example III*

The primer composition of Example II was azeotropically distilled to a water content of 0.9%. When applied as a primer in the manner described in Example II, substantially identical anchorage to the lead foil backing resulted. When the water content of the priming composition was reduced to 0.5%, however, it was surprisingly found to be necessary to heat the backing to 300° F. to achieve satisfactory adhesion; such heat tends to cause laterally extending wrinkles and buckles, which in turn causes undesirable waste.

*Example IV*

A 95:5 isoprene:acrylic acid copolymer was prepared as described in Example I and solvent-extracted as in Example II, to yield a primer composition containing about 9% copolymer, 5% water, and 86% solvent. When applied to 4-mil lead foil and dried at 150° F., this primer was firmly adhered; conventional tacky pressure-sensitive adhesives bonded firmly to the primer. When coated with rubber:rosin adhesive and subjected to the test described in the third paragraph of Example I, a force of 81 ounces per ½ inch of width was required to separate the tapes, failure occurring entirely within the rubber:rosin layer. Priming compositions comprising rubbery copolymers formed from as little as 2% unsaturated aliphatic acid are only about as effective as the reclaimed rubber primers of the prior art; although possessing utility they are generally not preferred. Other acyclic conjugated dienes, e.g., chloroprene, isomers of isoprene, or 2,3-dimethyl butadiene may also be substituted for the isoprene disclosed in this example.

*Example V*

An 80:20 butadiene-1,3:methacrylic acid copolymer was prepared as described in Example I and solvent-extracted as in Example II, to yield a primer composition containing about 10% copolymer, 6% water, and 84% solvent. The attempted addition of more water to the primer composition resulted in phase separation. When applied to 4-mil lead foil and dried at 150° F., this primer displayed the same affinity for both lead foil and tacky adhesives as the products of preceding examples. When subjected to the test described in the third paragraph of Example I, a force of 76 ounces per ½ inch was required to strip off the test tape. Compositions comprising rubbery copolymers formed from more than 20% unsaturated aliphatic acid are also effective primers, but they show a marked tendency to coagulate and hence are generally less attractive to use.

Having described our invention with the aid of illustrative examples, what we claim is:

1. Tape comprising a lead foil backing, a thin rubbery primer layer firmly adherently bonded to one surface of said backing, and a normally tacky and pressure-sensitive adhesive firmly adherently bonded to said primer layer, said primer layer consisting essentially of a copolymer of a minor percent of an ethylenically unsaturated lower aliphatic acid and a major percent of an acyclic conjugated diene which is capable of homopolymerization to a rubbery consistency.

2. Normally tacky and pressure-sensitive tape comprising a lead foil backing, a thin rubbery primer layer firmly adherently bonded to one surface of said backing, and a normally tacky and pressure-sensitive adhesive layer firmly adherently bonded to said primer layer, said primer layer consisting essentially of a copolymer of from about 2 to about 20% of an unsaturated acid in which a carbon-carbon double bond is conjugated with a carbonyl group and correspondingly from about 98 to 80% of an acyclic conjugated diene which is capable of homopolymerization to a rubbery consistency.

3. The product of claim 1 wherein the acid is acrylic acid.

4. The product of claim 1 wherein the acid is methacrylic acid.

5. The product of claim 1 wherein the diene is butadiene-1,3.

6. The product of claim 1 wherein the diene is isoprene.

7. The product of claim 1 wherein the primer consists essentially of a butadiene-1,3:methacrylic acid copolymer.

8. The product of claim 1 wherein the primer consists essentially of an isoprene:acrylic acid copolymer.

9. The product of claim 1 wherein the primer consists essentially of a butadiene-1,3:acrylic acid copolymer.

10. The product of claim 9 wherein the primer is a 90:10 butadiene-1,3:acrylic acid copolymer.

References Cited by the Examiner

UNITED STATES PATENTS

| | | | |
|---|---|---|---|
| Re. 24,906 | 12/60 | Ulrich | 117—68.5 |
| 2,106,133 | 1/38 | Goldman | 117—122 |
| 2,385,319 | 9/45 | Eustis et al. | 117—122 |
| 2,410,053 | 10/46 | Drew | 117—161 |
| 2,576,148 | 11/51 | Schechtman | 117—122 |
| 2,607,711 | 8/52 | Hendricks | 117—68.5 |
| 2,878,142 | 3/59 | Bohaty | 117—75 |
| 2,963,386 | 12/60 | Weshler et al. | 117—76 |
| 2,965,592 | 12/60 | Ethier et al. | 117—122 |
| 3,032,438 | 5/62 | Gaynes et al. | 117—75 |
| 3,076,720 | 2/63 | Rice et al. | 117—122 |
| 3,092,250 | 6/63 | Knutson et al. | 117—68.5 |

WILLIAM D. MARTIN, *Primary Examiner.*

RICHARD D. NEVIUS, *Examiner.*